(12) United States Patent
Park et al.

(10) Patent No.: US 9,558,392 B2
(45) Date of Patent: Jan. 31, 2017

(54) FINGER VEIN AUTHENTICATION SYSTEM

(71) Applicant: KORECEN CO., LTD, Seoul (KR)

(72) Inventors: Bong-joon Park, Gyeonggi-do (KR); Chul-joon Park, Osan-si (KR)

(73) Assignee: KORECEN CO., LTD., Seoul (KR)

( * ) Notice: Subject to any disclaimer, the term of this patent is extended or adjusted under 35 U.S.C. 154(b) by 0 days.

(21) Appl. No.: 14/620,668

(22) Filed: Feb. 12, 2015

(65) Prior Publication Data
US 2016/0239703 A1    Aug. 18, 2016

(51) Int. Cl.
*G06K 9/00* (2006.01)
*G06T 5/00* (2006.01)
(Continued)

(52) U.S. Cl.
CPC ............. *G06K 9/00093* (2013.01); *G06K 9/00* (2013.01); *G06K 9/00013* (2013.01);
(Continued)

(58) Field of Classification Search
CPC ........ G06K 9/00; G06K 9/00033; G06K 9/03; G06K 9/2018; G06K 9/2027; G06K 9/2036; G06K 9/6265; G06K 9/00375; G06K 9/00013; G06K 2009/00395; G06K 9/00597; G06K 9/00885; G06K 9/00026; G06K 9/0004; G06K 9/0008; G06K 9/00362; G06K 9/6807; G06K 2009/0006; G06K 2009/00932; G06K 9/00087; G06K 9/0006; G06K 9/00073; G06K 9/00093; G06K 9/20; G06F 21/32; G06F 3/0412; G06Q 20/40145; G06Q 20/36; F21Y 2101/02; H04L 63/0861; H04L 27/322; H04W 12/06; A61B 5/117; A61B 5/0059; A61B 5/0064; A61B 5/1172; A61B 5/489; A61B 5/441; A61B 5/6825; A61B 5/6826; G06T 2207/30101; G06T 1/0007; G06T 5/002; G02B 6/0068; B60R 25/25; B60R 25/252; G07C 9/00158; G01N 21/359; H04N 5/2254; H04N 5/2628; H04N 5/33; H04N 5/372
(Continued)

(56) References Cited

U.S. PATENT DOCUMENTS 7,310,133 B2 *  12/2007  Nagasaka .......... G06K 9/00013
                                                     356/71
7,915,601 B2 *   3/2011  Setlak ................ G06K 9/00013
                                                     250/221
(Continued)

*Primary Examiner* — Vu Le
*Assistant Examiner* — Aklilu Woldemariam
(74) *Attorney, Agent, or Firm* — Nixon Peabody LLP; David S. Resnick; David F. Crosby

(57) ABSTRACT

Provided is a finger vein authentication which recognizes, compares and distinguishes a user's finger vein at low capacity/high speed through a method for analyzing a level set curvature.

In order to achieve the above object, there is provided a finger vein authentication system including a light source unit configured to emit near-infrared light; an optical filter unit configured to allow only light with a specific wavelength in light incident from the light source unit to penetrate therethrough; a CCD camera unit configured to capture an image including an user's finger and then to convert the captured image into an electrical signal; a memory unit configured to store a level set curvature program, the level set curvature program performing an operation for extracting a finger vein pattern from the image including the finger using a level set curvature; and a control unit configured to drive the level set curvature program.

1 Claim, 5 Drawing Sheets

(51) Int. Cl.
*H04N 5/33* (2006.01)
*H04N 5/372* (2011.01)

(52) U.S. Cl.
CPC .......... *G06K 9/00073* (2013.01); *G06T 5/002* (2013.01); *H04N 5/33* (2013.01); *H04N 5/372* (2013.01); *G06K 2009/0006* (2013.01); *G06K 2009/00932* (2013.01)

(58) Field of Classification Search
USPC .................. 382/115, 124, 199, 225, 266
See application file for complete search history.

(56) References Cited

U.S. PATENT DOCUMENTS

| | | | | |
|---|---|---|---|---|
| 2003/0039382 A1* | 2/2003 | Yau | .................... | G06K 9/00067 382/125 |
| 2005/0047632 A1* | 3/2005 | Miura | ................ | G06K 9/00013 382/124 |
| 2005/0254695 A1* | 11/2005 | Nagasaka | .......... | G06K 9/00013 382/126 |
| 2006/0002592 A1* | 1/2006 | Miura | ................ | G06K 9/00006 382/115 |
| 2007/0177767 A1* | 8/2007 | Miura | .................... | G06K 9/00 382/115 |
| 2008/0127031 A1* | 5/2008 | Olsson | ................ | G03F 7/70283 716/54 |
| 2008/0316323 A1* | 12/2008 | Morita | ................ | A61B 5/0059 348/222.1 |
| 2008/0317293 A1* | 12/2008 | Sakurai | .............. | G06K 9/00013 382/115 |
| 2009/0043210 A1* | 2/2009 | Kitoh | .................... | A61B 5/0059 600/476 |
| 2009/0110249 A1* | 4/2009 | Miura | ................ | G06K 9/00006 382/124 |
| 2009/0129635 A1* | 5/2009 | Abe | .................... | G06K 9/00006 382/115 |
| 2010/0080422 A1* | 4/2010 | Sato | .................... | G06K 9/0004 382/115 |
| 2010/0098304 A1* | 4/2010 | Kiyomizu | .......... | G06K 9/00013 382/124 |
| 2010/0292578 A1* | 11/2010 | Sato | .................... | A61B 5/0059 600/473 |
| 2010/0292579 A1* | 11/2010 | Sato | .................... | G06K 9/00013 600/474 |
| 2012/0002846 A1* | 1/2012 | Yokoi | .................. | G06K 9/6265 382/115 |
| 2012/0082348 A1* | 4/2012 | Fukuda | .............. | G06K 9/00375 382/115 |
| 2012/0165683 A1* | 6/2012 | Kono | .................... | G06K 9/00 600/476 |
| 2012/0189171 A1* | 7/2012 | Abiko | .................... | G06K 9/036 382/115 |
| 2012/0230555 A1* | 9/2012 | Miura | ................ | G06K 9/00087 382/124 |
| 2013/0004031 A1* | 1/2013 | Abiko | .................... | G06K 9/00026 382/124 |
| 2013/0148865 A1* | 6/2013 | Kono | .................... | G06K 9/00 382/115 |
| 2013/0259321 A1* | 10/2013 | Aoki | .................. | G06K 9/00885 382/115 |
| 2015/0020181 A1* | 1/2015 | Iwata | .................... | G06F 21/32 726/7 |

\* cited by examiner

Distinguish ridge and valley with level set curvature

Distinguish ridge and valley with gradient vector

FINGER VEIN AUTHENTICATION SYSTEM

BACKGROUND

1. Field

The present invention relates to a finger vein authentication, and more particularly, to a finger vein authentication which recognizes, compares and distinguishes a user's finger vein at low capacity/high speed through a method for analyzing a level set curvature.

2. Description of the Related Art

In general, a bio-metric authentication is a method of recognizing the identity of an individual using a physiologic or behavior characteristics of a human. As the representative bio-metric authentication technology, there are a finger print recognition, a face recognition, an iris recognition, a finger vein recognition, a signature recognition, a speaker recognition, and the like. In the above bio-metric methods, the finger print recognition and the finger vein recognition are advantageous in that a recognition performance is excellent, users do not have resistance and discomforts, and a recognition time is short.

The concept that it is possible to perform an identification using user's fingerprint has been widely employed a long time ago for the purpose of finding criminals, and the fact that everybody has different fingerprint has been already widely known. However, if a finger on which fingerprint is formed suffers external injury, is dried or wet, it is difficult to take a pattern of epidermis fingerprint through a conventional fingerprint scanner.

In order to solve the above drawback, some studies proposed a method in which visible light passes through the finger to take a dermal fingerprint and utilize it for the identification. The dermal fingerprint can be taken under any condition as long as the finger is not seriously injured.

In addition, the concept that the identification can be performed by a finger vein was approved by other study. other study indicates that if the finger vein patters of ten fingers of every person differ from each other, one finger vein pattern has a degree of freedom which is similar to that of the iris pattern with high reliability and this finger vein pattern is suitable for the identification.

Since the dermal finger print and the finger vein are taken to utilize for the identification like the above, the researches to solve the drawback of the epidermis fingerprint which does not well taken been carried out.

SUMMARY

The present invention is invented to solve the above mentioned problems, an object of the present invention is to provide to a finger vein authentication which recognizes, compares and distinguishes a user's finger vein at low capacity/high speed through a method for analyzing a level set curvature.

In order to achieve the above object, one aspect of the present invention provides a finger vein authentication system including a light source unit configured to emit near-infrared light; an optical filter unit configured to allow only light with a specific wavelength in light incident from the light source unit to penetrate therethrough; a CCD camera unit configured to capture an image including an user's finger and then to convert the captured image into an electrical signal; a memory unit configured to store a level set curvature program, the level set curvature program performing an operation for extracting a finger vein pattern from the image including the finger using a level set curvature; and a control unit configured to drive the level set curvature program. Here, the level set curvature program instructs the control unit to (a) remove a noise from the image including the finger obtained from the CCD camera unit; (b) remove a peripheral part of the finger from the image including the finger from which the noise is removed to separate the image of only the finger portion; (c) extract the finger vein pattern from the image of only the finger portion using the level set curvature, (d) binarize the extracted finger vein pattern, and (e) make the binarized finger vein pattern become thin.

According to the preferred embodiment, extracting of the finger vein pattern from the image of only the finger portion using the level set curvature in (c) may be performed by (c1) a first operation for defining a pixel intensity for each of all the pixels forming the image of only the finger, (c2) a second operation for mutually connecting the pixels having the same pixel intensity in all the pixels to create one or more level sets which are a closed curve, (c3) a third operation for defining one or more level sets as a set of level sets, (c4) a fourth operation for creating one or more lines connecting points of the one or more level sets, at which a curvature is minimized based on an outside of the level sets set, and (c5) a fifth operation for recognizing one or more lines as the finger vein pattern and extracting the lines.

According to the preferred embodiment, the curvature in (c4) may be obtained by the following equation.

$$\overline{w} = \begin{cases} w/\|w\| & \text{if } \|w\| > 0 \\ 0_d & \text{if } \|w\| = 0 \end{cases}$$

$$\overline{K} = -div(\overline{w})$$

wherein $\overline{K}$ represents the curvature and w represents a gradient vector of the set of level sets.

According to the preferred embodiment, the optical filter may be a near-infrared light (NIR) pass filter and may be configured to allow only the light with a wavelength of 630~1,000 nm which is suitable for sensing oxyhemoglobin ($HbO_2$) and deoxyhemoglobin (Hb) in hemoglobin contained in the finger vein of the user to penetrate therethrough.

According to the preferred embodiment, the finger vein authentication system of the present invention may further comprise a key input unit having a plurality of keys including numeral, character and symbol to output a key signal corresponding to the key selected by the user.

BRIEF DESCRIPTION OF THE DRAWING

The above and other objects, features and advantages of the present invention will become more apparent to those of ordinary skill in the art by describing in detail exemplary embodiments thereof with reference to the accompanying drawings, in which.

DETAIL DESCRIPTION OF THE EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention. It should be noted that although the same structural elements are shown in different drawings, the same structural elements are indicated by the same reference numerals. In the description of the present invention, in addition, if it is judged that the know functions or structures can unnecessarily obscure the essentials of the present invention, the concrete description thereon will be omitted.

In the following description, when there is an expression that some portion "includes" some structural elements, this means that some portion does not exclude another structural element, but may further another structural element unless referred to the contrary. In addition, the terms such as "portion", "device" and "module" mentioned in the detail description mean a unit for processing at least one function or an operation, and this may be embodied as a hardware, a software or a combination of hardware and software.

Figure 1A:
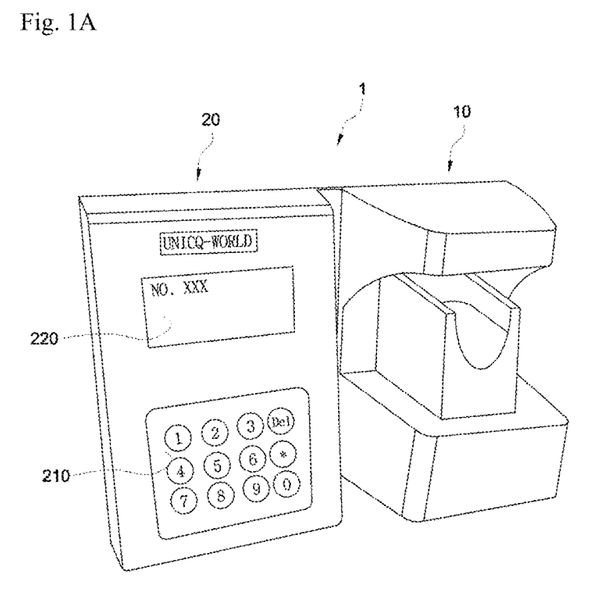
FIG. 1A is a perspective view showing an external appearance of a finger vein authentication system according to one embodiment of the present invention.
Figure 1B:
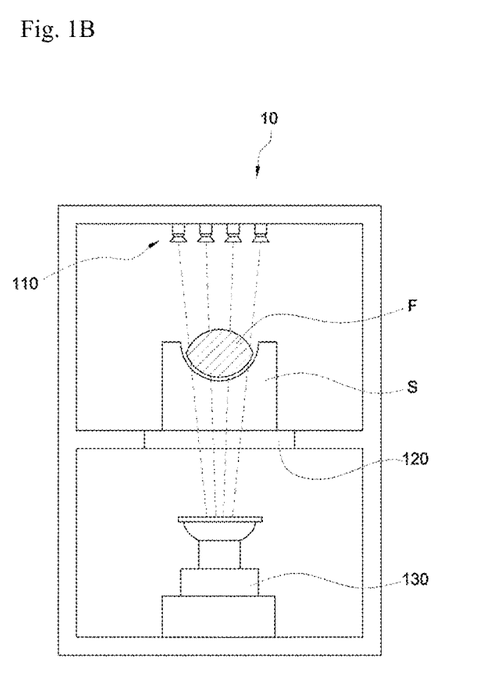
FIG. 1B is a view illustrating an internal structure of an image processing device of a finger vein authentication system shown in FIG. 1A.
Figure 2:
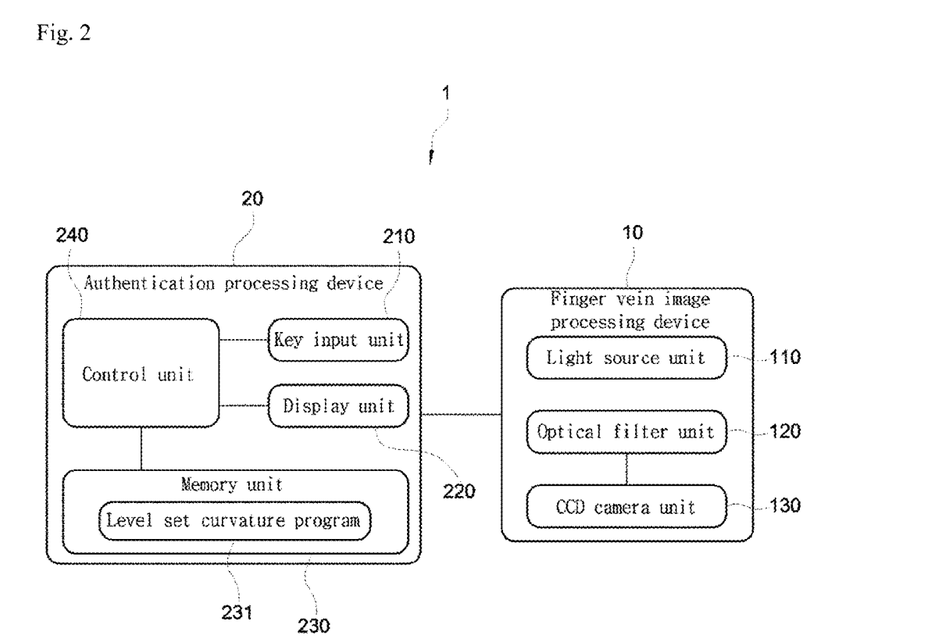
FIG. 2 is a block diagram illustrating an internal configuration of a finger vein authentication system shown in FIG. 1A.

FIG. 1A is a perspective view showing an external appearance of a finger vein authentication system 1 according to the present invention, FIG. 1B is a view illustrating an internal structure of an finger vein image processing device 10 of the finger vein authentication system 1, and FIG. 2 is a block diagram illustrating an internal configuration of the finger vein authentication system 1.

The finger vein authentication system 1 according to the present invention is a system for obtaining a digital image through a CCD camera based on an image obtained by irradiating a user's finger with near-infrared ray, extracting a characteristic of a finger vein pattern from the obtained image using a level set curvature program and identifying an individual by a method in which the extracted pattern characteristic is compared with the user's information which is already recorded.

For example, the finger vein authentication system 1 may be installed on a wall face next to a door, and an user can complete an entrance authentication only through a motion of simply inserting (putting) his or her own finger 20 on a finger seating part S of the finger vein image processing device 10 for an entrance authentication. At this time, if the user's vein pattern does not coincide with a vein pattern registered in the finger vein authentication system 1, the entrance authentication is rejected.

Meanwhile, in the following description, the finger vein authentication system 1 through the embodiment in which the user completes the authentication using only the vein pattern recognition will be described. In another embodiment, however, it is possible to strengthen security in such a way that the personal identification number is input through a key input unit 210 after and/or before the user's vein pattern is authenticated. For example, the user can obtain the authentication in such a way that the finger vein patter is verified after inputting the personal identification into the key input unit 210.

Referring together to FIG. 1A, FIG. 1B and FIG. 2, the finger vein authentication system 1 according to the present invention includes the finger vein image processing device 10 acquiring a finger image and an authentication processing device 20 extracting a finger pattern from the acquired image and performing a user authentication process. Meanwhile, the finger vein image processing device 10 includes a light source unit 110 configured to emit near-infrared light, an optical filter unit 120 configured to allow only light with a specific wavelength in light incident from the light source unit 110 to penetrate therethrough and a CCD camera unit 130 configured to capture an image including an user's finger and then to convert the captured image into an electrical signal. In addition, the authentication processing device 20 includes the key input unit 210 having a plurality of keys including numeral, character and symbol to output a key signal corresponding to the key selected by the user, a display unit 220 configured to display various input screens on the user authentication and a result screen on an outside, a memory unit 230 configured to store the level set curvature program, and a control unit 240 configured to drive the level set curvature program.

Specifically, the finger seating part S having a cut cylindrical shape and a structure in which a finger is inserted is formed in the finger vein image processing device 10, the light source unit 110 is installed on a body face above the finger seating part S and the optical filter unit 120 and the CCD camera unit 130 are installed below the finger seating part S.

For example, in the case in which the user puts his or her own finger on the finger seating part S for the user authentication, the near-infrared light emitted from the light source unit 110 penetrates the finger on the finger seating part S and then passes through the optical filter unit 120 and reaches the CCD camera unit 130 to capture the finger image. Subsequently, the finger image captured by the CCD camera unit 130 is stored in the memory unit 230 according to control of the control unit of the authentication processing device 20. In addition, according to a command of the level set curvature program 231, the control unit 240 then performs a processing operation for judging whether the finger vein pattern in the finger image coincides with the user's finger vein pattern registered in advance.

The light source unit 110 may include, for example, one or more LEDs or laser diodes having a structure emitting the near-infrared light with a wavelength of 630~1,000 nm. According to the preferred embodiment, a light wave guide formed of polydimethylsiloxane may be attached on a rear face of the light source unit 110, due to this light wave guide, it is possible to irradiate the finger with the light without scattering of the light.

For example, the optical filter unit 120 may include the near-infrared light pass filter. The optical filter unit 120 performs a function by which only the finger vein image can be captured under the situation in which the user's finger is exposed to the visible light. According to the preferred embodiment, the optical filter unit 120 may be configured to allow the light with a wavelength of 630~1,000 nm which is suitable for sensing oxyhemoglobin ($HbO_2$) and deoxyhemoglobin (Hb) in hemoglobin to penetrate therethrough.

The CCD camera unit 130 performs a function for converting the image of the finger F, which is captured by the near-infrared light emitted from the light source unit 110, into the electrical signal. In addition, the electrical image signal on the finger F, which is obtained by the CCD camera unit 130, is stored in the memory unit 230 by means of control of the control unit 240.

Figure 3:
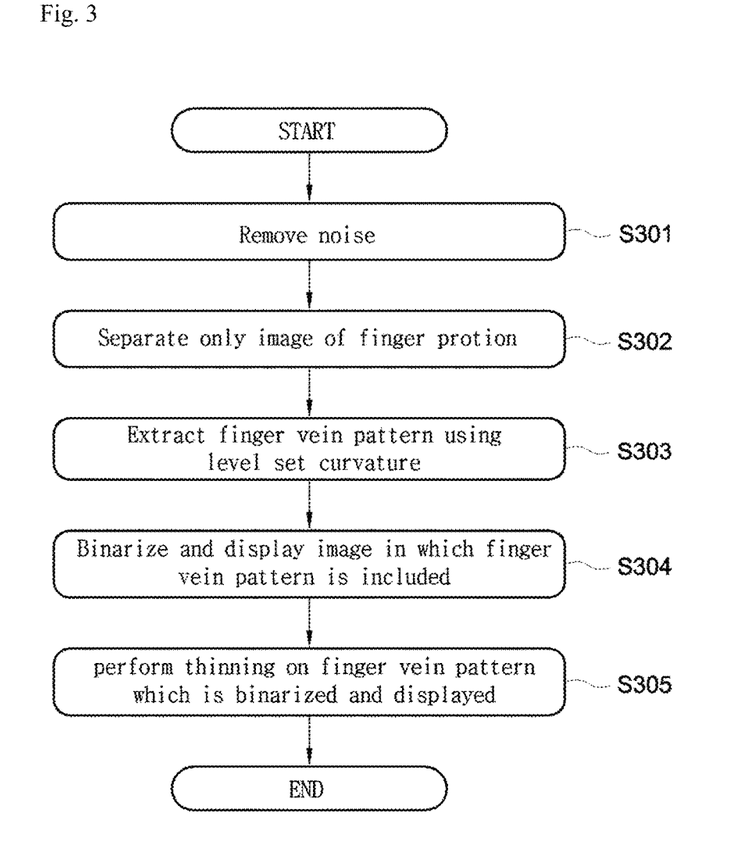
FIG. 3 is an algorithm flow chart representing a process in which a finger vein authentication system shown in FIG. 1A extracts a finger vein according to a command of a level set curvature program.

FIG. 3 is an algorithm flow chart showing a process in which the control unit 240 extracts the vein pattern from the image on the finger F received from the CCD camera unit 130, according to the command of the level set curvature program 231.

Referring to FIG. 3, the control unit 240 of the authentication processing device 20 drives the level set curvature program 231 stored in the memory unit 230 to perform (a) a processing operation S301 for removing a noise from the image on the finger, which is obtained from the CCD camera unit 130, (b) a processing operation S302 for removing a peripheral part of the finger from the image on the finger from which the noise is removed to separate the image of only the finger portion, (c) a processing operation S303 for extracting the finger vein pattern from the image on the finger portion using the level set curvature, (d) a processing operation S304 for binarizing the extracted finger vein pattern, and (e) a processing operation S305 for making the binarized finger vein pattern thin.

According to the command of the level set curvature program 231, subsequently, the control unit 240 may determine whether the thinned finger vein pattern coincides with the finger vein pattern which is registered in advance.

The above level set curvature program 231 may be provided to the finger vein authentication system 1 by means of an external storage media such as a flexible disc, a hard disc, an optical disc, a magneto-optical disc, a CD-ROM, a CD-R, a magnetic tape, a non-volatile memory card and a ROM.

Hereinafter, the finger vane extraction algorithm provided by the level set curvature program 231 will be described in detail with reference to FIG. 4 to FIG. 8.

[Process S301 for Removing the Noise]

The level set curvature program 231 applied to the finger vein authentication system 1 according to the present invention employs a Gaussian filtering method to perform an operation for removing the noise from the image on the finger.

For example, the level set curvature program 231 may perform an operation process for dividing the image on the finger into blocks with a certain dimension, for example, M lines×N pixels, an operation process for calculating a standard deviation regarding a pixel of each divided block, an operation process for selecting the smallest standard deviation from the standard deviations and quantizing the smallest standard deviation with the integer to calculate the minimum standard deviation ($\sigma_{min}$), and an operation process for selecting a block B* having the minimum standard deviation ($\sigma_{min}$) and the standard deviation which is within a predetermined range.

At this time, the block B* can be calculated using Equation 1 as follows.

$$B^* = \{b_v \lfloor \sigma_{\bar{y}} \rfloor = \lfloor \sigma_{min} \rfloor\}$$ [Equation 1]

wherein, B* represents the selected block and, $\lfloor \cdot \rfloor$ represents a floor function for obtaining a maximum integral which is less than or the same as the given value.

Subsequently, the level set curvature program 231 calculates a filter factor for performing the Gaussian filter method on the selected block B*. At this time, the filter factor can be calculated from the quantized minimum standard deviation ($\sigma_{min}$) by the following Equation 2.

$$h(x, y) = \frac{1}{2\pi \lfloor \sigma_{min} \rfloor^2} \exp(-(x^2 + y^2)/2 \lfloor \sigma_{min} \rfloor^2)$$ [Equation 2]

Next, the level set curvature program 231 performs filtering on the selected block B* according to the calculated filter factor.

Subsequently, the level set curvature program 231 calculates the standard deviation of the difference between the selected block and a value obtained by performing Gaussian-filtering on the block as a noise measuring value a $\sigma_\eta$, and this noise measuring value is represented as the following Equation 3.

$$\widetilde{\sigma_\eta} = B^* - \{B^*\}$$ [Equation 3]

By the above process, the level set curvature program 231 can calculate the noise which is irrelevant to the finger portion of the image on the finger, and can remove the noise.

Figure 4:
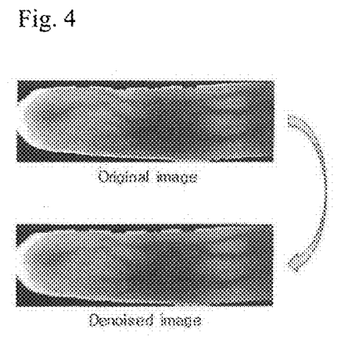
FIG. 4 is a view for comparing a finger image from which a noise is removed according to a level set curvature program with a finger image before removing a noise.

FIG. 4 is a view for comparing the finger image from which the noise is removed according to the level set curvature program 231 with the finger image before removing a noise.

[Process S302 for Separating Only the Image of the Finger Portion]

The level set curvature program 231 applied to the finger vein authentication system 1 according to the present invention performs an operation for separating the image of the finger portion from the image on the finger.

The image captured by the CCD camera unit 130 includes the image of the finger portion as well as the image of peripheral objects. According to the preferred embodiment, the level set curvature program 231 can perform an operation for separating the image of the finger portion from the entire image using an edge detect function which uses a divergence of gradient.

For example, the edge defect function using the divergence of gradient may use the following Equation 4.

$$\tilde{K} = -\text{div}(w)$$ [Equation 4]

(w: Gradient vector of the image)

Figure 5:
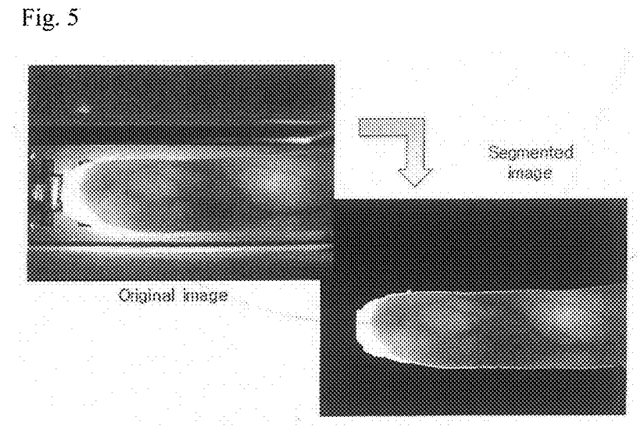
FIG. 5 is a view showing a result screen of a process for separating an image of a finger portion from the entire image according to a level set curvature program.

FIG. 5 shows a result screen obtained by separating the image of the finger portion from the entire image according to the level set curvature program 231.

[Process S303 for Extracting the Finger Vein Pattern Using the Level Set Curvature]

The level set curvature program 231 applied to the finger vein authentication system 1 according to the present invention performs an operation for extracting the finger vein pattern from the image of the finger portion using the level set curvature.

Here, the level set indicates a collection of the pixels having the same intensity when each pixel value of the image is regarded as an intensity function.

Therefore, if the intensity function is a continuous function, the points forming one level set form one level sets.

Specifically, the level set curvature program 231 performs the process for extracting the finger vein pattern from the finger image through (c1) a first operation for defining a pixel intensity for each of all the pixels forming the image of only the finger image, (c2) a second operation for mutually connecting the pixels having the same pixel intensity in all the pixels to create one or more level sets which are a closed curve, (c3) a third operation for defining one or more level sets as a set of level sets, (c4) a fourth operation for creating one or more lines connecting points of the one or more level sets, at which a curvature is minimized based on an outside of the set of level sets, and (c5) a fifth operation for recognizing one or more lines as the finger vein pattern and extracting the lines.

Figure 6A:
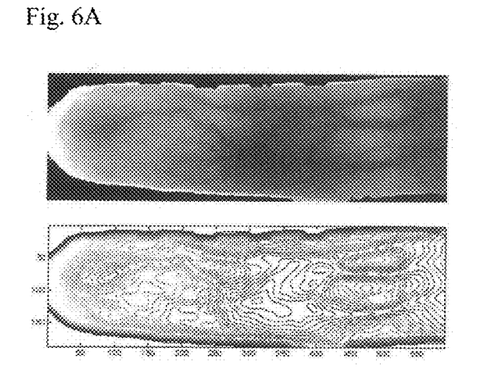
FIG. 6A is a view showing that the finger image is changed into level sets according to a level set curvature program.
Figure 6B:
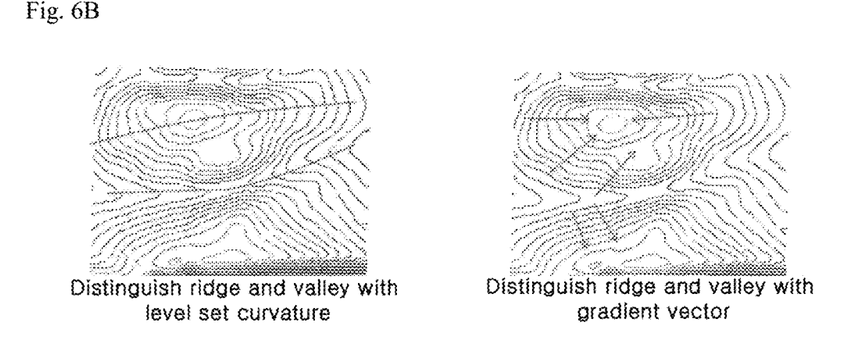
FIG. 6B is a view showing a method in which a level set curvature program distinguishes a finger vein pattern using level sets of FIG. 6A.

FIG. 6A shows that the finger image is changed into a shape of a set of level sets according to the level set curvature program 231 and FIG. 6B shows a method in which the level set curvature program 231 distinguishes the finger vein pattern using the curvature of the set of level sets of FIG. 6A.

First, referring to FIG. 6A, the set of level sets is created by an operation for defining a pixel intensity of each of all the pixels forming the image of the finger portion of the finger image and an operation for mutually connecting the pixels of all the pixels, which have the same pixel intensity, to create one or more level sets which is a closed curve.

Next, referring to FIG. 6B, the level set curvature program 231 extracts the finger vein pattern from the finger image through an operation for creating one or more lines connecting points of one or more level sets, at which a curvature is minimized based on an outside of the set of level sets, and an operation for recognizing one or more lines as the finger vein pattern and extracting the lines.

The method in which the points at which the curvature is minimized are connected to each other by the lines based on an outer side of the set of level sets is similar to the geographical method for finding a valley in the level sets.

Specifically, the level set curvature program 231 is based on the principle in which, in respective level sets forming the set of level sets included in the finger image, when calculated based on an outside of the set of level sets, the line mutually connecting the points at which the curvature is maximized becomes a ridge and the line mutually connecting the points at which the curvature is minimized becomes a valley and a place on which the venules are distributed corresponds to a pattern of valley of the set of level sets.

Such the point at which the curvature is minimized may be obtained by finding the points of the respective level sets, at which the $\overline{K}$ is the smallest value, through Equation 5 as follows.

$$\overline{w} = \begin{cases} w/\|w\| & \text{if } \|w\| > 0 \\ 0_d & \text{if } \|w\| = 0 \end{cases}$$ [Equation 5]

$$\overline{K} = -div(\overline{w})$$

wherein, $\overline{K}$ represents the curvature, w represents the gradient vector, a portion corresponding to the finger vein has a significantly low $\overline{K}$ value.

As described above, the level set curvature can be obtained by means of a divergence of normalized gradient. At this time, it is intuitively ascertained that the gradient vectors are collected at a ridge of the level sets and the gradient vectors are diverged at a valley portion of the level sets.

Figure 7:
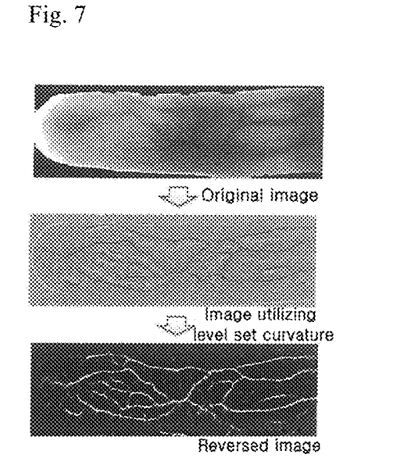
FIG. 7 is a view showing that a value $\overline{K}$ of a level set curvature is normalized with 8 bit gray level.

FIG. 7 shows that the value $\overline{K}$ is normalized with 8 bit gray level and it can be ascertained that a portion corresponding to a center line of the vein has a remarkable small value.

[Process S304 for Binarizing the Extracted Finger Vein Pattern, and Process S305 for Making the Binarized Finger Vein Pattern Thin]

The level set curvature program 231 applied to the finger vein authentication system 1 according to the present invention performs an operation S304 for binarizing the extracted finger vein pattern utilizing the level set curvature and an operation S305 for thinning the binarized image.

Here, the binarizing process performed by the level set curvature program 231 is the process for reducing s storage space of the extracted finger vein pattern and for reducing a matching time which is a subsequent process.

In addition, the thinning process performed by the level set curvature program 231 is the process for converting a thick vein indication into a thin vein indication to enable a lot more information about the vein to be stored without a distortion.

Figure 8:
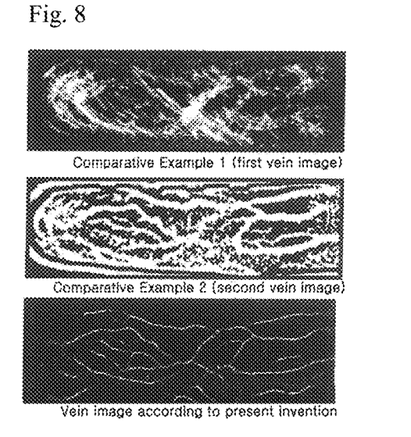
FIG. 8 is a view for comparing a vein image extracted according to a level set curvature program with vein images obtained by conventional methods.

FIG. 8 is a view for comparing the final vein image obtained by extracting the vein pattern from the finger image, binarizing and thinning the extracted pattern according to the level set curvature program 231 with the first vein image obtained by a conventional line tracking method and the second vein image obtained by a conventional local threshold method.

As can be known from FIG. 8, it can be found that the vein image obtained according to the level set curvature program 231 is much clearer than the conventional vein images so that little error occurs on a boundary surface.

The level set curvature program 231 applied to the finger vein authentication system 1 according to the present invention may be recorded in a computer-readable recording medium. An example of the computer readable recording medium includes ROM, RAM, CD-ROM, a magnetic tape, a floppy disc, an optical data storage device, and includes a carrier wave type recording medium (for example, a transferring via the Internet). In addition, the computer-readable recording medium may be distributed in the computer systems connected over a network to store and execute the computer-readable code in a distributed manner. In addition, the functional program, code and code segment for realizing the present embodiment may be easily deduced by programmers in the art to which the present invention pertains.

In addition, even though the detail description describes that one of all the structural elements constituting the embodiment of the present invention is operated and combined, the present invention is not necessarily limited to this embodiment. Within the range of the invention, in other words, one or more structural elements may be selectively coupled and operated. Also, although all the structural elements may be embodied as one independent hardware, respectively, some or all the structural elements may be combined to be embodied as a computer program having a program module performing some or all the functions combined in one or plurality of hardware.

In addition, the above description describes exemplarily the technical spirit of the present invention, it will be apparent to those skilled in the art that various changes and modifications may be made without departing from the spirit and scope of the invention. Therefore, the embodiment disclosed in the present invention does not limit, but describes the technical spirit of the present invention, the present invention is not limited by this embodiment. The scope of the present invention should be determined by the appended claims and it should be interpreted that all the technical spirits which are within the equivalency range of the appended claims are intended to be embraced therein.

What is claimed is:

1. A finger vein authentication system comprising;
a light source unit configured to emit near-infrared light;
an optical filter unit configured to allow only light with a specific wavelength in light incident from the light source unit to penetrate there through;
a CCD camera unit configured to capture an image including a user's finger and then to convert the captured image into an electrical signal;
a memory unit configured to store a level set curvature program, the level set curvature program performing an operation for extracting a finger vein pattern from the image including the finger using a level set curvature; and
a control unit configured to drive the level set curvature program;
wherein the level set curvature program instructs the control unit to
(a) remove noise from the image including the finger obtained from the CCD camera unit;
(b) remove a peripheral part of the finger from the image including the finger from which the noise is removed to separate the image of only the finger portion;
(c) extract the finger vein pattern from the image of only the finger portion using the level set curvature,
(d) binarize the extracted finger vein pattern, and
(e) make the binarized finger vein pattern become thin,
wherein extracting of the finger vein pattern from the image of only the finger portion using the level set curvature is performed by
(c1) a first operation for defining a pixel intensity for each of all the pixels forming the image of only the finger,
(c2) a second operation for mutually connecting the pixels having the same pixel intensity in all the pixels to create one or more level sets which are a closed curve,
(c3) a third operation for defining one or more level sets as a set of level sets,
(c4) a fourth operation for creating one or more lines connecting points of the one or more level sets, at which a curvature is minimized based on a set outside of the level sets, and
(c5) a fifth operation for recognizing one or more lines as the finger vein pattern and extracting the lines;
wherein the curvature ($\overline{K}$) in (c4) is obtained by the following equation:

$$\overline{w} = \begin{cases} w/\|w\| & \text{if } \|w\| > 0 \\ 0_d & \text{if } \|w\| = 0 \end{cases}$$

$$\overline{K} = -div(\overline{w})$$

wherein ($\overline{K}$) represents the curvature and w represents a gradient vector of the set of level sets;
wherein the optical filter is a near-infrared light (NIR) pass filter and is configured to allow only the light with a wavelength of 630~1,000 nm which is suitable for sensing oxyhemoglobin ($HbO_2$) and deoxyhemoglobin (Hb) in hemoglobin contained in the finger vein of the user to penetrate there through; and further comprising a key input unit having plurality of keys including numeral, character and symbol keys to output a key signal corresponding to the key selected by an user.

\* \* \* \* \*